(12) United States Patent
Ryoo

(10) Patent No.: US 6,631,312 B2
(45) Date of Patent: Oct. 7, 2003

(54) METHOD FOR ACQUIRING VEHICLE DRIVING INFORMATION AND A SYSTEM THEREOF

(75) Inventor: Nam-Kyoo Ryoo, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/029,969

(22) Filed: Dec. 31, 2001

(65) Prior Publication Data

US 2002/0198631 A1 Dec. 26, 2002

(30) Foreign Application Priority Data

Jun. 20, 2001 (KR) ........................ 2001-35145

(51) Int. Cl.$^7$ ................................. G05D 1/00
(52) U.S. Cl. .............. 701/1; 701/96; 701/93; 342/70
(58) Field of Search ................ 701/1, 96, 93, 701/91; 342/70; 180/167; 340/435, 436

(56) References Cited

U.S. PATENT DOCUMENTS

| 5,710,565 | A | * | 1/1998 | Shirai et al. ............ 342/70 |
| 6,018,308 | A | * | 1/2000 | Shirai ..................... 342/70 |
| 2002/0138193 | A1 | * | 9/2002 | Miyahara ............... 701/96 |

OTHER PUBLICATIONS

Miyahara, Tracking of a target vehicle using adaptive cruise control, 2002/0138193 A1.*

* cited by examiner

Primary Examiner—Marthe Y. Marc-Coleman
(74) Attorney, Agent, or Firm—Antonelli, Terry, Stout & Kraus, LLP

(57) ABSTRACT

In order to enhance reliability of a determination regarding whether a preceding vehicle is running in the same lane as a following vehicle when only one of the preceding vehicle and the following vehicle is in a curved region of a road, a distance and an apart-angle of the preceding vehicle, and an amplitude of a reflective wave are detected, and it is determined, on the basis of the detected apart-angle and amplitude of the reflective wave, whether the preceding vehicle is in the same lane as the following vehicle.

14 Claims, 3 Drawing Sheets

METHOD FOR ACQUIRING VEHICLE DRIVING INFORMATION AND A SYSTEM THEREOF

BACKGROUND OF THE INVENTION (a) Field of the Invention

The present invention relates to an intelligent cruise control system, and more particularly, to a method and system for acquiring vehicle driving-information in an intelligent cruise control system.

(b) Description of the Related Art

Recently, a vehicle equipped with an intelligent cruise control system (referred to as "ICC vehicle" hereinafter) has been under development, where the intelligent cruise control system (referred to as "ICC system" hereinafter) is a system for automatically controlling a vehicle speed, including braking and accelerating of the vehicle, when the ICC system is activated.

One of a radar sensor or a laser sensor is used in such an ICC system for measuring a distance to a preceding vehicle, of which the radar sensor is more widely used because the laser sensor is substantially affected by circumstantial factors such as rain and fog.

Also, such an ICC system includes a steering angle sensor (or yaw-rate sensor) for detecting a steering angle (or a yaw-rate) that is used as a parameter while following a preceding vehicle during driving on a curved road.

Therefore, it must be determined whether the preceding vehicle is running in the same lane with an ICC vehicle, which is realized, for a general ICC system using a radar sensor, by detecting an apart-angle (that is, an angle between the direction that the ICC vehicle is aiming and the direction toward the preceding vehicle) and comparing the detected apart-angle with a predetermined angle.

Such a simple method for determining whether a preceding vehicle is running in the same lane is found to be reliable in cases in which both the preceding vehicle and the ICC vehicle are running on a straight portion of the road or both are in a curved region. However, in a case that only one of the preceding vehicle and the ICC vehicle is running on a straight portion and the other is running in a curved region, that is, in a case in which a preceding vehicle has just entered the curved region and a following ICC vehicle has not yet entered the curved region, or in a case in which a preceding vehicle has just left a curved region while the following ICC vehicle is still in the curved region, the result of the prior method is not satisfactory.

SUMMARY OF THE INVENTION

The present invention is a method and a system for acquiring vehicle driving information that increases reliability when only one of a preceding vehicle and an ICC vehicle is in a curved region of a road.

The present invention provides a method for acquiring driving information of a following vehicle comprising detecting a distance to a preceding vehicle; detecting an apart-angle of the preceding vehicle; detecting an amplitude of a reflective wave reflected by the preceding vehicle; and determining, on the basis of the detected apart-angle and the detected amplitude of a reflective wave, whether the preceding vehicle is in the same lane as the following vehicle.

In the determining whether the preceding vehicle is in the same lane, it is determined that the preceding vehicle is running in the same lane if the detected apart-angle is greater than a predetermined angle and the detected amplitude of the reflective wave is less than a predetermined reference amplitude, where the predetermined reference amplitude preferably depends on the distance to the preceding vehicle and the apart-angle of the preceding vehicle.

In the determining whether the preceding vehicle is in the same lane, it is determined that the preceding vehicle is not running in the same lane if the detected apart-angle is not greater than a predetermined angle and the detected amplitude of the reflective wave is less than a predetermined reference amplitude, where the predetermined reference amplitude depends on the distance to the preceding vehicle and the apart-angle of the preceding vehicle.

If the preceding vehicle is running in the same lane or not, it can be further determined whether the following vehicle is running in the curved region, and based on the determination, it is determined that the following vehicle is exiting from the curved region if it is determined the following vehicle is running in the curved region; and it is determined that the following vehicle is entering into the curved region if it is determined that the following vehicle is not running in the curved region. It is on the basis of a steering angle or yaw rate of the following vehicle that it is determined whether the following vehicle is running in the curved region.

The method of the present invention is realized by a system for acquiring driving information of a following vehicle comprising a detecting unit for detecting a distance from the following vehicle to a preceding vehicle, and an amplitude of a reflective wave reflected from the preceding vehicle; a steering angle detector for detecting a steering angle of the following vehicle; and a control unit for acquiring the driving information based on detected values detected by the detecting unit, wherein the control unit performs each of the steps of the method of the present invention.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
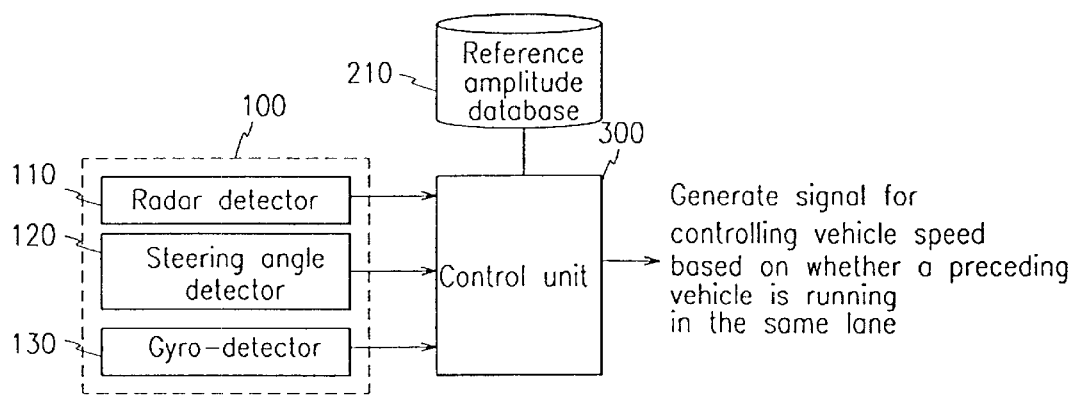
FIG. 1 is a block diagram of a system for acquiring vehicle driving information of a following vehicle according to a preferred embodiment of the present invention.

FIG. 1 is a block diagram of a system for acquiring vehicle driving information of a following vehicle according to a preferred embodiment of the present invention.

As shown in FIG. 1, a system for acquiring driving information of a following vehicle according to a preferred embodiment includes a detecting unit 100, a predetermined reference amplitude database 210, and a control unit 300.

The detecting unit 100 includes a radar detector 110, a steering angle detector 120, and a gyro-detector 130.

The radar detector 110 detects a distance to a preceding vehicle, an apart-angle of the preceding vehicle, and an amplitude of a reflective radar beam reflected from the preceding vehicle, and transmits corresponding signals to the control unit 300.

The steering angle detector 120 detects a steering angle of the following vehicle and transmits a corresponding signal to the control unit 300.

The gyro-detector 130 detects a yaw-rate of a vehicle and transmits a corresponding signal to the control unit 300.

The predetermined reference amplitude database 210 stores reference amplitudes of the reflected radar beam in relation to the distance and the apart-angle of the preceding vehicle.

The stored reference amplitudes are criteria on which it is determined whether a preceding vehicle is running in the same lane when the distance and the apart-angle of the preceding vehicle are detected. Therefore, each of a total distance-range and a total apart-angle range of the preceding vehicle is divided into a plurality of ranges, and corresponding reference amplitudes are stored in relation to each of such divided distance ranges and apart-angle ranges, in, for example, a two-dimensional map.

The control unit 300 acquires driving information related to the preceding vehicle based on signals inputted from the detecting unit 100 and the predetermined reference amplitude database 210, and generates signals for controlling a speed of the vehicle based on the acquired driving information.

The control unit 300 can be realized by one or more processors activated by predetermined software, and the predetermined software can be programmed to perform each step of a method according to a preferred embodiment of this invention.

A method for acquiring driving information of a following vehicle according to a preferred embodiment of this invention, which is a function that the control unit 300 performs, is hereinafter described in detail.

Figure 2:
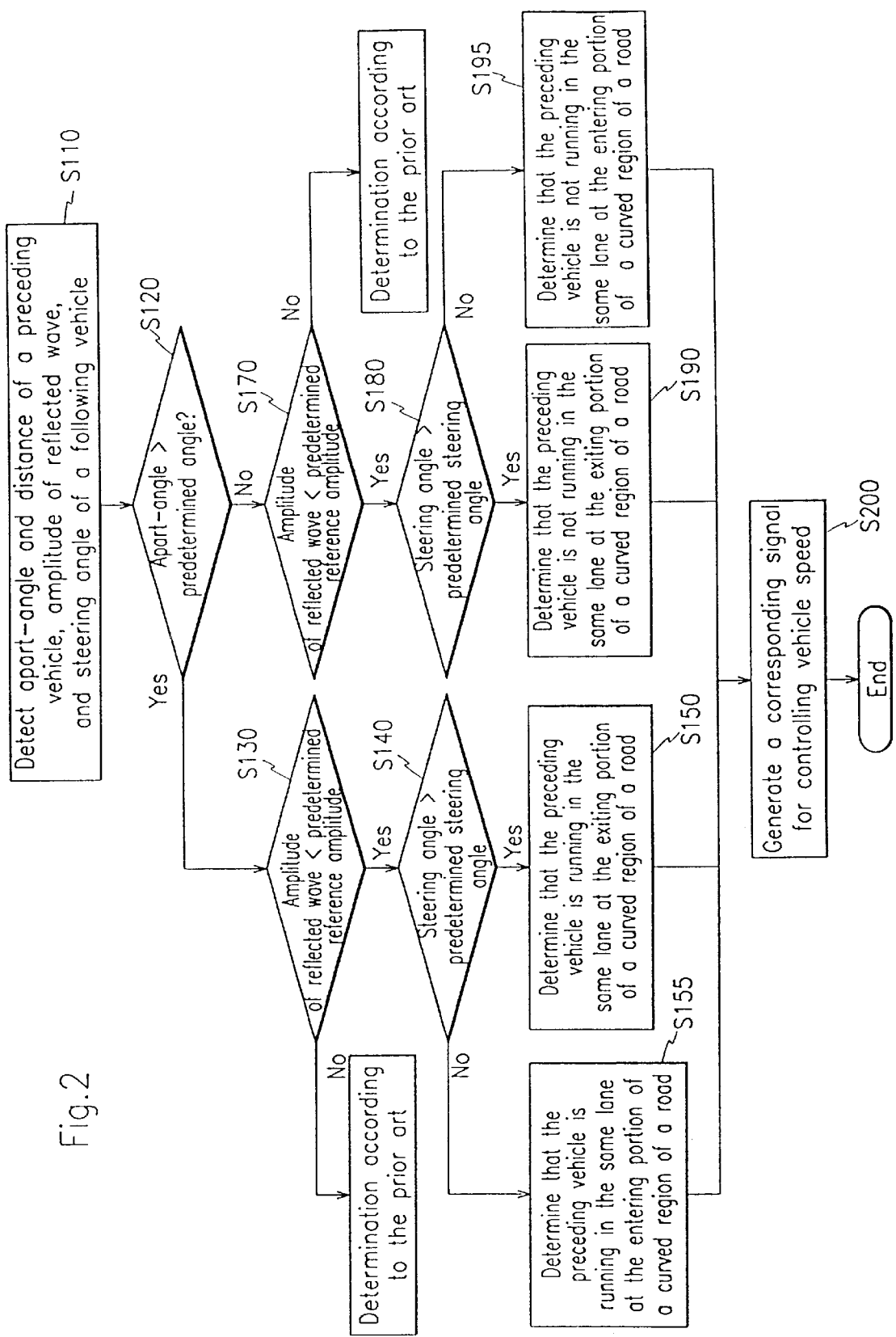
FIG. 2 is a flowchart showing a method for acquiring vehicle driving information of a following vehicle according to a preferred embodiment of the present invention.

FIG. 2 is a flowchart showing a method for acquiring vehicle driving information of a following vehicle according to a preferred embodiment of the present invention.

As shown in FIG. 2, a vehicle (referred to as "following vehicle" hereinafter) equipped with a system for acquiring driving information according to the preferred embodiment, or more specifically, the control unit 300 of the system, determines a distance to a preceding vehicle, an apart-angle of the preceding vehicle, and the amplitude of a reflected radar wave, using the radar detector 110 at S110.

Subsequently the control unit 300 determines whether the detected apart-angle of the preceding vehicle is greater than a predetermined angle at step S120.

When the apart-angle of the preceding vehicle is greater than the predetermined angle at step S120, the control unit 300 determines whether the amplitude of the reflective wave reflected from the preceding vehicle is smaller than a reference amplitude at step S130.

The reference amplitude, depending on a distance to and an apart-angle of the preceding vehicle, is retrieved from the predetermined reference amplitude database 210.

If the amplitude of the reflective wave is smaller than the reference amplitude at step S130, it may be determined that the preceding vehicle is running in the same lane as the following vehicle at an entering or a exiting portion of a curved region of a road. When the amplitude of the reflective wave is not less than the reference amplitude, it can be determined according to a method of the prior art whether the preceding vehicle is running in the same lane as the following vehicle.

When the detected amplitude of the reflective wave is less than the reference amplitude at step S130, the control unit 300 further determines whether a steering angle of the following vehicle is greater than a predetermined steering angle at step S140, in order to determine whether the following vehicle is running in a curved region of a road.

If the steering angle of the following vehicle is greater than the predetermined steering angle at step S140, it is determined that the following vehicle is at an exiting portion of the curved region of the road at S150, and if the steering angle of the following vehicle is not greater than the predetermined steering angle, it is determined that the following vehicle is entering into the curved region of the road at step S155. Subsequently the control unit 300 generates a corresponding control signal at step S200, based on a determination of steps S150 and S155.

When the apart-angle of the preceding vehicle is not greater than the predetermined angle at step S120, the control unit 300 determines whether the amplitude of the reflective wave is smaller than a reference amplitude at step S170.

The reference amplitude, depending on a distance to and an apart-angle of the preceding vehicle, is retrieved from the predetermined reference amplitude database 210.

If the amplitude of the reflective wave is smaller than the reference amplitude at step S170, it may be determined that the preceding vehicle is not running in the same lane as the following vehicle at an entering or an exiting portion of a curved region of a road. When the amplitude of the reflective wave is not less than the reference amplitude, it can be determined according to a method of the prior art whether the preceding vehicle is running in the same lane as the following vehicle.

When the detected amplitude of the reflective wave is less than the reference amplitude at step S170, the control unit 300 further determines whether a steering angle of the following vehicle is greater than a predetermined steering angle at step S180, in order to determine whether the following vehicle is running in a curved region of a road.

If the steering angle of the following vehicle is greater than the predetermined steering angle at step S180, it is determined that the following vehicle is at an exiting portion of the curved region of the road at S190, and if the steering angle of the following vehicle is not greater than the predetermined steering angle, it is determined that the following vehicle is entering into the curved region of the road at step S195. Subsequently the control unit 300 generates a corresponding control signal at step S200, based on a determination of steps S190 and S195.

Figure 3:
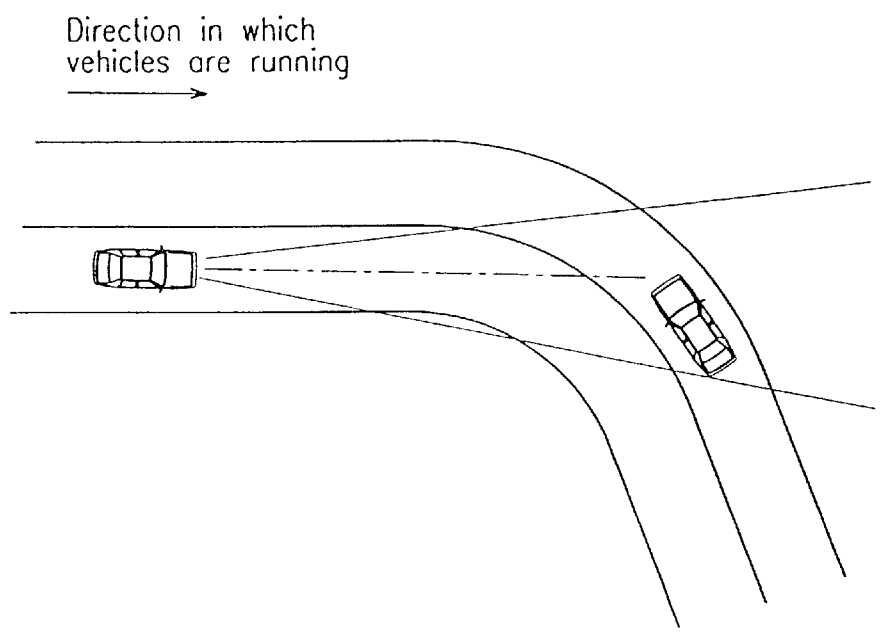
FIG. 3 is a drawing for illustrating, at an entering of a curved region of a road, how it is determined whether a preceding vehicle is running in the same lane, according to a preferred embodiment of the present invention.

FIG. 3 is a drawing for illustrating, at an entering of a curved region of a road, how it is determined whether a preceding vehicle is running in the same lane, according to a preferred embodiment of the present invention.

As shown in FIG. 3, when a preceding vehicle B has just entered into a curved region of a road and a following vehicle A has not yet entered the curved region, an apart-angle of the preceding vehicle B is detected as a value near 0 even though the preceding vehicle is running in a lane other than the lane of the following vehicle A.

However, a vehicle body of the preceding vehicle B, which has already entered into the curved region, is misaligned with respect to a direction in which the following vehicle is running, by as much as the road portion in which the preceding vehicle B is running is curved.

Therefore, an amplitude of a reflective wave reflected from the preceding vehicle B is smaller than an amplitude of a reflective wave reflected from a preceding vehicle when the vehicles are running on a straight road.

Therefore, it is correctly determined that the preceding vehicle is not running in the same lane even though the apart-angle of the preceding vehicle B is small.

As described above, according to a preferred embodiment of this invention, reliability in acquiring vehicle driving information is increased when only one of a preceding vehicle and a following vehicle is running in a curved region of a road.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for acquiring driving information of a following vehicle comprising:
    detecting a distance to a preceding vehicle;
    detecting an apart-angle of the preceding vehicle;
    detecting an amplitude of a reflective wave reflected by the preceding vehicle; and
    determining, on the basis of the detected apart-angle and the detected amplitude of a reflective wave, whether the preceding vehicle is in the same lane as the following vehicle; and wherein
        in the determining whether the preceding vehicle is in the same lane, it is determined that the preceding vehicle is running in the same lane if the detected apart-angle is greater than a predetermined angle and the detected amplitude of the reflective wave is less than a predetermined reference amplitude.

2. The method of claim 1, wherein the predetermined reference amplitude depends on the distance to the preceding vehicle and the apart-angle of the preceding vehicle.

3. The method of claim 1, comprising:
    determining whether the following vehicle is running in a curved region;
    determining that the following vehicle is exiting from the curved region if it is determined that the following vehicle is running in the curved region; and
    determining that the following vehicle is entering into the curved region if it is determined that the following vehicle is not running in the curved region.

4. The method of claim 1, wherein it is determined whether the following vehicle is running in the curved region on the basis of a steering angle of the following vehicle.

5. A method for acquiring driving information of a following vehicle comprising:
    detecting a distance to a preceding vehicle;
    detecting an apart-angle of the preceding vehicle;
    detecting an amplitude of a reflective wave reflected by the preceding vehicle; and
    determining, on the basis of the detected apart-angle and the detected amplitude of a reflective wave, whether the preceding vehicle is in the same lane as the following vehicle; and wherein
        in the determining whether the preceding vehicle is in the same lane, it is determined that the preceding vehicle is not running in the same lane if the detected apart-angle is not greater than a predetermined angle and the detected amplitude of the reflective wave is less than a predetermined reference amplitude.

6. The method of claim 5, wherein said predetermined reference amplitude depends on the distance to the preceding vehicle and the apart-angle of the preceding vehicle.

7. The method of claim 5, further comprising:
    determining whether the following vehicle is running in a curved region;
    determining that the following vehicle is exiting from the curved region if it is determined that the following vehicle is running in the curved region; and
    determining that the following vehicle is entering into the curved region if it is determined that the following vehicle is not running in the curved region.

8. The method of claim 5, wherein it is determined whether the following vehicle is running in the curved region on the basis of a steering angle of the following vehicle.

9. A system for acquiring driving information of a following vehicle comprising:
    a detecting unit detecting a distance from the following vehicle to a preceding vehicle, an apart-angle of the preceding vehicle, and an amplitude of a reflective wave reflected from the preceding vehicle;
    a steering angle detector detecting a steering angle of the following vehicle; and
    a control unit determining, on the basis of the detected apart-angle and the detected amplitude of a reflective wave, whether the preceding vehicle is in the same lane as the following vehicle; and wherein
        in the determining whether the preceding vehicle is in the same lane; it is determined that the preceding vehicle is running in the same lane if the detected apart-angle is greater than a predetermined angle and the detected amplitude of the reflective wave is less than a predetermined reference amplitude.

10. The system of claim 9, wherein the predetermined reference amplitude depends on the distance to the preceding vehicle and the apart-angle of the preceding vehicle.

11. The system of claim 9, wherein the control unit further performs:
    determining whether the following vehicle is running in a curved region;
    determining that the following vehicle is exiting from the curved region if it is determined the following vehicle is running in the curved region; and
    determining that the following vehicle is entering into the curved region if it is determined that the following vehicle is not running in the curved region.

12. The system of claim 9, wherein it is determined whether the following vehicle is running in the curved region on the basis of a steering angle of the following vehicle.

13. A system for acquiring driving information of a following vehicle comprising:
    a detecting unit detecting a distance from the following vehicle to a preceding vehicle, an apart-angle of the preceding vehicle, and an amplitude of a reflective wave reflected from said preceding vehicle;
    a steering angle detector detecting a steering angle of the following vehicle; and a control unit determining, on the basis of the detected apart-angle and the detected amplitude of a reflective wave, whether the preceding vehicle is in the same lane as the following vehicle; and wherein in the determining whether the preceding vehicle is in the same lane, it is determined that the preceding vehicle is not running in the same lane if the detected apart-angle is not greater than a predetermined angle and the detected amplitude of the reflective wave is less than a predetermined reference amplitude.

14. The system of claim 13, wherein the predetermined reference amplitude depends on the distance to the preceding vehicle and the apart-angle of the preceding vehicle.

* * * * *